Oct. 4, 1955   J. H. STARR   2,719,740
CONNECTING MEANS
Filed Oct. 15, 1949

INVENTOR.
JOHN H. STARR
BY
ATTORNEY

United States Patent Office 2,719,740
Patented Oct. 4, 1955

2,719,740

CONNECTING MEANS

John H. Starr, Mayville, Wis., assignor to John Deere Van Brunt Company, Horicon, Wis., a corporation of Wisconsin Application October 15, 1949, Serial No. 121,578

4 Claims. (Cl. 287—20.3)

The present invention relates generally to agricultural implements and more particularly to ground-working implements also equipped with material-distributing means adapted to be controlled by a means that raises and lowers the soil-working means of the implement.

The object and general nature of the present invention is the provision of an agricultural implement including ground-working means, a self-interrupting clutch for raising and lowering the ground-working means, and material-distributing means controlled directly from said power lift clutch and independent of any depth adjusting means that is interposed between the self-interrupting clutch and the ground-working means.

More particularly, it is an important feature of this invention to provide means for controlling the disconnect clutch of a fertilizer attachment for a ground-working implement by a direct connection with the power lift unit of the implement, whereby the adjustments for depth of operation of the ground-working means does not affect the timing or the operation of connecting and disconnecting the fertilizer attachment clutch.

These and other objects and advantages will be apparent to those skilled in the art after a consideration of the following detailed description, taken in conjunction with the accompanying drawings, in which.

Figures 1, 2, 3, 4:
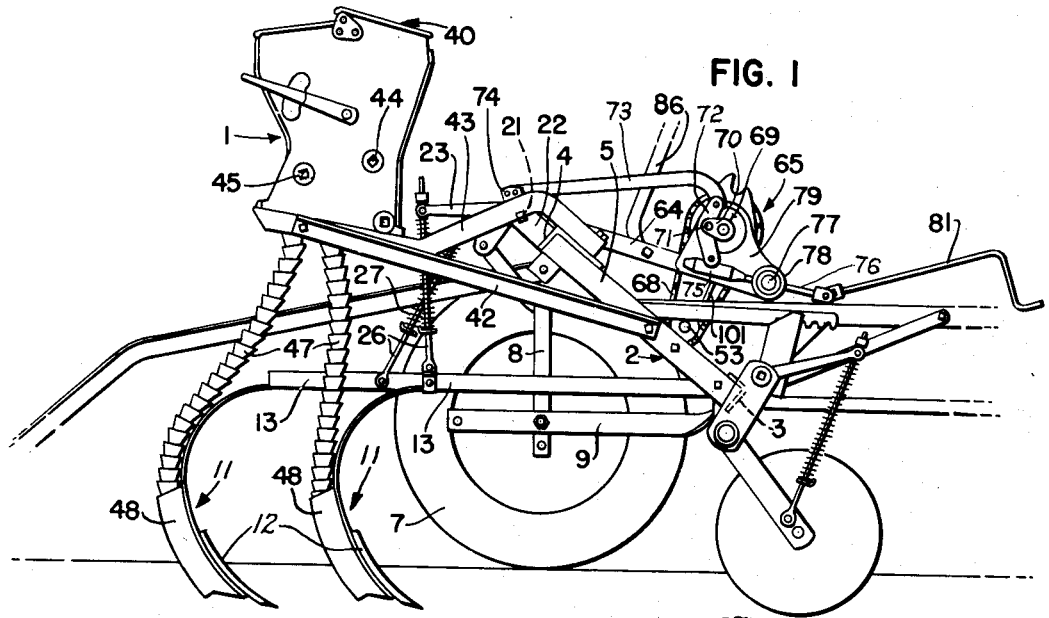
Figure 1 is a side view of a field cultivator with fertilizer attachment controlled by mechanism constructed according to the principles of the present invention.
Figure 2 is a fragmentary side view of a power lift clutch and associated parts.
Figure 3 is an enlarged sectional view taken generally along the line 3—3 of Figure 2, showing the preferred manner of connecting the clutch throwout arm with the driven member of the power lift clutch.
Figure 4 is a sectional view taken along the line 4—4 of Figure 3.

Referring now to the drawings, particularly Figure 1, the field cultivator, which is indicated in its entirety by the reference numeral 1, is somewhat similar to the field cultivator shown in U. S. Patent 2,032,085, issued December 25, 1936, to T. J. Erdman, to which reference may be made if necessary. Briefly, the field cultivator shown includes a generally elongated rectangular frame 2 disposed in a transverse position and including front and rear transverse frame angles 3 and 4 and end angles 5. A pair of ground wheels 7 are connected by suitable supports 8 and 9 with the frame 2. The cultivator 1 also includes ground-working means in the form of furrow openers 11 which include the spring-mounted, ground-engaging teeth 12. The furrow openers 11 are connected to drag bars 13 which are pivotally connected in any suitable way with the forward frame angle 3. A lifting shaft 21 is pivotally mounted for rocking movement in brackets 22 fixed to the rear frame angle 4. The rockshaft 21 carries a plurality of lifting arms 23, one for each of the drag bars 13, the arms 23 being connected to the associated drag bars by means of lifting rods 26 and associated compression springs 27. A fertilizing and seeding attachment 40 is constructed and arranged to be carried on the frame 2 by auxiliary frame bars 42 and 43, and the fertilizing and seeding attachment includes seeding mechanism, represented by a seeding shaft 44, and fertilizer distributing mechanism, indicated by a fertilizer distributor shaft 45. The seed and fertilizer are delivered to the furrow openers 11 through a plurality of flexible tubes 47, each of which is connected to a distributing boot 48 fixed to the associated furrow opener 11. The seed and fertilizer distributing mechanism 44 and 45 is driven by sprocket and chain means which interconnects the shafts 44 and 45 and a chain 51 which at its forward portion is driven by a disconnect clutch unit 52 actuated by an associated jackshaft 53, the latter being driven by suitable chain and sprocket means from the adjacent ground wheel 7. The material-distributing means and the driving mechanism therefor are conventional, so far as the present invention is concerned, the clutch 52 being of the usual construction, comprising a driven sprocket having clutch teeth and a driving member fixed to the jackshaft 53, the sprocket being slidable on the jackshaft and controlled by a pair of cam members, one of which includes an arm section 61 which may be rocked to engage or disengage the clutch 52.

The jackshaft 53 is also connected to drive a power lift unit supported on one of a pair of fore and aft extending crossbars 64 forming a part of the frame 2. The power lift unit, which is indicated in its entirety by the reference numeral 65, preferably is in the form of a self-interrupting clutch mechanism which includes a driving sprocket 66 driven from the jackshaft by means of a pinion and a chain 68 which at its upper portion is trained over the driving member 66 of the self-interrupting clutch 65. The latter unit also includes a driven member 69 having a tubular bearing portion formed with a crank 70 at one end, and the crank 70 has an eccentrically disposed pin 71 on which an elbow member 72 is swingably mounted. The upper end of the elbow member 72 is connected by means of a fore and aft extending link 73 with an arm 74 that is fixed to the lifter shaft 21. The other arm of the elbow member 72 is connected pivotally to a swivel member 75 which is rotatably anchored to an adjusting screw 76 that is threaded through a block 77 rockably held in a portion 78 of a right-hand bearing bracket 79, which together with a left-hand bracket 80, serves to support the rotatable driven member 69 of the clutch unit 65. A manually operated crank member 81 is connected to the forward end of the adjusting screw 76.

The mechanism per se of the self-interrupting clutch 65 is substantially the same as that shown in the prior United States Patent 2,029,127, issued January 28, 1936, to John Schaeffer, to which reference may be made if desired. As best shown in Figure 3, the driven member 69 of the clutch unit 65 includes a tubular portion 83 having a central recess or aperture 84 therein. The clutch unit 65 is, as mentioned above, of the self-interrupting type and is controlled by a trip lever 86 so as to swing the driven member 69 into either of two predetermined positions, one position being that in which the rockshaft 21 is rocked in a clockwise direction (Figure 1) to raise the ground-working tools 11, and in the other position of the driven member 69 of the clutch 65, the rockshaft 21 is rocked in a counterclockwise direction to lower the tools 11. When the parts are in the latter position turning the adjusting screw 76 has the effect of changing the relation between the arm 74 on the rockshaft 21 and the driven clutch member 69 in its operating position, which is for the purpose of increasing or decreasing the depth of operation of the tools 11.

In implements of the kind described above, it is desirable to automatically disconnect the drive to the seed and fertilizer distributing mechanism when the furrow openers 11 are raised into a transport position and to automatically engage the distributing mechanism drive clutch whenever the tools 11 are lowered. In prior constructions with which I am familiar, this has been accomplished by establishing a connection between the lifting rockshaft and the jackshaft or other means driven by the ground wheels. However, this type of throw-out arrangement changing the depth adjusting means to increase or decrease the depth of operation of the tools 11 would have the effect of changing the timing relation between the tool lifting means and the distributing means because of the variations introduced into the linkage by the above mentioned depth adjustments. It is the object of the present invention to avoid the above mentioned and other disadvantages of controlling the material-distributing clutch by a connection with the lifting rockshaft when the position of that member is itself varied by the adjustments necessary to secure the desired depth of operation at different times or under different operating conditions. Instead, according to the principles of the present invention, I provide a direct connection between the driven member of the self-interrupting clutch and the distributing mechanism control clutch, whereby the latter clutch is engaged or disengaged by the operation of the power lift clutch, entirely independently of depth adjustments of the ground-working tools which are raised and lowered by the power lift clutch.

Referring now more particularly to Figures 2–4, I provide a clutch throw-out arm 90 which comprises a main arm section 91 apertured, as at 92, and provided at the other end with an angularly disposed, tapered section 93. The arm 90 is apertured, as at 94, at a point adjacent the tapered portion 93 so as to loosely receive a bolt 96 having a head 97 at one end and a nut 98 at the other end. The opening 94 is disposed quite close to the angled tapered portion 93 so that when the tapered end 93 of the throw-out arm 90 is inserted into the recess or aperture 84 of the driven member 69 of the self-interrupting clutch 65, the arm 90 may quickly and easily be rigidly fixed to the driven member of the clutch by tightening the nut 98, which causes the head 97 to be drawn along the tapered portion with the result that the parts are expanded within the opening 84, firmly fixing the inner end of the arm 90 to the driven member 69 of the clutch. A link member 101 is extended from the outer end of the arm 90 down to the arm portion 61 of the disconnect clutch 52, one end 102 of the link being turned laterally and inserted into the opening 92 in the arm 90, the other end 103 of the link 101 being also turned laterally and inserted in the opening in the arm portion 61 of the clutch 52 (Figure 2).

From the above description, it will be clear that in operation, the self-interrupting clutch, in raising and lowering the tools 11, serves to operate the clutch 52 for connecting and disconnecting the drive to the seed and fertilizer distributing means, which connection is established or interrupted, entirely independent of the position of the adjusting elbow member 72 and the corresponding variations in the position of the lift shaft 21.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. Means for connecting a part in operative relation with a member, said member having a generally cylindrical aperture and said part having a tapered portion disposed within said aperture and forming a flat wedge-shaped section extending generally longitudinally of and lying within said aperture, the narrower part of said wedge-shaped section extending inwardly and lying closer to the adjacent wall of said aperture than the outer or wider part of said wedge-shaped section, said means comprising a bolt having a head movable along said wedge-shaped section and engaging the latter and the opposite wall of said aperture, said part having a portion disposed outwardly of said tapered portion lying approximately normal to said tapered portion, said outwardly disposed portion having an opening receiving the outer end of said bolt, and a nut on said bolt adapted, when tightened, to draw the head portion thereof along said tapered portion and thereby wedge said part within said aperture.

2. Means for connecting a part in operative relation with a member, said member having a generally cylindrical aperture and said part having an attaching portion disposed within said aperture and extending generally longitudinally of and lying within said aperture, said portion engaging the inner surface of said aperture at one side thereof and having an inclined surface extending convergingly outwardly toward the other side of said aperture, said means comprising a bolt having a head movable along said cam-like surface and engaging the latter and said other side of said aperture, said part having a portion disposed outwardly of said attaching portion and having an opening receiving the outer end of said bolt, and a nut on said bolt adapted, when tightened, to draw the head portion thereof along said inclined surface and thereby wedge said part within said aperture.

3. Means for connecting a part in operative relation with a member, said member having a generally cylindrical aperture and said part having a tapered portion disposed within said aperture and forming a flat wedge-shaped section extending generally longitudinally of and lying within said aperture, the narrower part of said wedge-shaped section extending inwardly and both the narrower and the wider parts of said wedge-shaped section engaging the adjacent wall of said aperture, the narrower part lying closer to the adjacent wall of said aperture than the outer or wider part of said wedge-shaped section, whereby the outer face of said wedge-shaped section forms an inclined portion lying at an angle to the longitudinal axis of said aperture, said means comprising a bolt having a head movable along said inclined portion engaging the latter and the opposite wall of said aperture, said part having a portion disposed outwardly of said tapered portion lying approximately normal to said tapered portion, said outwardly disposed portion having an opening receiving the outer end of said bolt, and a nut on said bolt adapted, when tightened, to draw the head portion thereof along said tapered portion and thereby wedge said part within said aperture.

4. Means for connecting a part in operative relation with a member, said member having a cylindrical aperture and said part having a flat tapered portion provided with converging side edges which form a narrow end and a wide end, said tapered portion being arranged with its narrow end disposed inwardly, said narrow end lying closer to the adjacent wall of said aperture than the wide end, a second part disposed within said aperture and said second part having an inner enlarged portion movable along said tapered portion and engaging the latter and the aperture wall opposite said tapered portion, and means connected with the outer end of said second part and acting against said first part to move the inner enlarged portion of said second part along said tapered portion into wedging relation between the latter and the inner wall of said aperture.

References Cited in the file of this patent

UNITED STATES PATENTS

| 142,616 | Cleaveland | Sept. 9, 1873 |
| 623,373 | Jerome | Apr. 18, 1899 |

(Other references on following page)

| | | |
|---|---|---|
| 958,440 | Sackman | May 17, 1910 |
| 994,007 | Kilgore | May 30, 1911 |
| 1,398,263 | Hale | Nov. 29, 1921 |
| 1,475,257 | Bottone | Nov. 27, 1923 |
| 1,797,296 | Ray | Mar. 24, 1931 |
| 1,842,059 | Alegria | Jan. 19, 1932 |
| 1,846,487 | Hipple | Feb. 23, 1932 |
| 2,031,650 | Hendricks et al. | Feb. 25, 1936 |
| 2,062,108 | Rickerson | Nov. 24, 1936 |
| 2,078,631 | Gagne | Apr. 27, 1937 |
| 2,189,185 | Thompson | Feb. 6, 1940 |
| 2,234,923 | Geraldson | Mar. 11, 1941 |
| 2,351,078 | Silver | June 13, 1944 |
| 2,376,464 | White | May 22, 1945 |
| 2,621,981 | Schick | Dec. 16, 1952 |